United States Patent
Doray et al.

(10) Patent No.: US 10,752,224 B2
(45) Date of Patent: Aug. 25, 2020

(54) METHOD OF ADJUSTING AN ESTIMATED VALUE OF THE HEIGHT OF THE GRAVITY CENTER OF A VEHICLE

(71) Applicant: VOLVO TRUCK CORPORATION, Gothenburg (SE)

(72) Inventors: Jean-Baptiste Doray, Chasse sur Rhône (FR); Frédéric Behouche, Crolles (FR); Fabrice Ranc, Simandres (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 35 days.

(21) Appl. No.: 16/081,093

(22) PCT Filed: Mar. 7, 2016

(86) PCT No.: PCT/IB2016/000417
§ 371 (c)(1),
(2) Date: Aug. 30, 2018

(87) PCT Pub. No.: WO2017/153797
PCT Pub. Date: Sep. 14, 2017

(65) Prior Publication Data
US 2019/0054905 A1 Feb. 21, 2019

(51) Int. Cl.
*B60T 8/172* (2006.01)
*B60T 8/1755* (2006.01)
*B60W 40/13* (2012.01)

(52) U.S. Cl.
CPC .......... *B60T 8/172* (2013.01); *B60T 8/17551* (2013.01); *B60W 40/13* (2013.01); *B60G 2400/63* (2013.01); *B60W 2040/1315* (2013.01)

(58) Field of Classification Search
CPC .... B60T 8/172; B60T 8/17551; B60W 40/13; B60W 2040/1315; B60W 2520/263; B60G 2400/63
USPC ......................................................... 701/124
See application file for complete search history.

(56) References Cited

U.S. PATENT DOCUMENTS

| 2012/0136563 A1* | 5/2012 | Obuchi | ................. B60W 40/13 |
| | | | 701/124 |
| 2012/0173133 A1* | 7/2012 | Ranc | ...................... B60T 8/172 |
| | | | 701/124 |
| 2015/0232091 A1* | 8/2015 | Lich | ........................ B62J 27/00 |
| | | | 701/41 |

(Continued)

FOREIGN PATENT DOCUMENTS

| DE | 102004058791 A1 | 6/2006 |
| DE | 102008042433 A1 | 4/2010 |

(Continued)

OTHER PUBLICATIONS

International Search Report (dated Dec. 8, 2016) for corresponding International App. PCT/IB2016/000417.

*Primary Examiner* — Muhammad Shafi
(74) *Attorney, Agent, or Firm* — Venable LLP; Jeffri A. Kaminski

(57) ABSTRACT

A method for adjusting an estimated height of the center of gravity (HCOG) value of a vehicle includes concomitant calculations, based on parameters dependent on the HCOG value and parameters independent from the HCOG value. The method further comprises the adjustment of a parameter related to the HCOG value.

4 Claims, 2 Drawing Sheets

(56) References Cited

U.S. PATENT DOCUMENTS

2016/0313213 A1* 10/2016 Takahashi ........... G01M 17/007
2016/0313214 A1* 10/2016 Takahashi ......... G01M 17/0074

FOREIGN PATENT DOCUMENTS

| DE | 102014200987    * | 1/2014 |
| DE | 102014200987 A1  | 7/2015 |
| EP |      1749722 A1  | 2/2007 |
| WO |   2005039955 A2  | 5/2005 |
| WO |   2011036511 A1  | 3/2011 |

* cited by examiner

METHOD OF ADJUSTING AN ESTIMATED VALUE OF THE HEIGHT OF THE GRAVITY CENTER OF A VEHICLE

BACKGROUND AND SUMMARY

The present invention is directed to a method of adapting or adjusting an estimated value of the height of the center of gravity (HCOG) of a vehicle in accordance to its payload. In particular, the present method comprises two concomitant determinations of the load transfer during a braking period. One of these two concomitant determinations only relies on the characteristics of the vehicle, while the other one considers a variable parameter related to the height of the center of gravity. Said variable parameter is then adjusted to minimize the difference between the values determined according to the two concomitant determinations. The present method is thus particularly adapted to the industrial vehicles, like trucks, long haul trucks, and heavy duty vehicles, although it can be implemented on various other vehicles, like passenger cars or recreational vehicles. The present invention also encompasses a system adapted to adjust the HCOG estimated value according to the method hereunder described, as well as a vehicle equipped with such a system.

The HCOG value is a key parameter for a vehicle, and in particular for the dynamic control functions of a vehicle. The dynamic control functions include the ESC functions, which automatically detect an abnormal trajectory of a vehicle and correct its behavior. The dynamic control functions also include the detection and the prevention of the Roll Over of an industrial vehicle. The dynamic control functions are usually calibrated according to the mass and/or the height of the center of gravity of the vehicle. Since the mass and/or the center of gravity of the vehicle are not necessarily constant from one travel to the other, the dynamic control functions needs to be updated with the actual HCOG value for each travel to avoid inadequate activation of the dynamic control functions. Several methods are used to determine or estimate the HCOG value of a vehicle. Some of those methods are based on the slippage rate of the wheels, such as described in WO2011036511. Other methods are based on the yaw rate of the vehicle like in EP1749722. Each of these methods allows to compute an estimated value of HCOG. However, such calculations generally necessitate the collection of sufficient data, which are statistically relevant, before being implemented within the dynamic control system. A certain period of time is therefore necessary before the dynamic control functions become in accordance with the real running conditions, during which the dynamic control functions of the vehicle may be inappropriately activated.

It is desirable to address this deficiency.

The aim of an aspect of the present method is to quickly adjust the HCOG estimated value of a vehicle. To this extent, the difference between the normal forces applied at the front wheels and the normal forces applied at the rear wheels is computed according to two different ways, each of which involves different parameters. One of the computation ways only involves parameters independent from the height of the gravity center, while the other computing way includes a variable parameter related to the height of the gravity center. The two computations are concomitant during a braking period. Thus, the value obtained by the two computation ways can be compared, and the variable related to the height of the gravity center may be properly adjusted.

Therefore, the method according to an aspect of the present invention includes the following key steps:

a) Determining the slippage rate of the wheels during a braking period.

b) Determining a reference value ΔNref corresponding to the difference between the normal forces applied at the front wheels and at the rear wheels of the vehicle, during this braking period, using characteristics of the vehicle which are independent from the HCOG value.

c) Concomitantly determining the difference ΔN between the normal forces applied at the front wheels and at the rear wheels, using a variable parameter related to the HCOG value.

d) Comparing the values of ΔNref determined in step b) and ΔN determined in step c), e) Optionally adjusting the variable parameter related to the HCOG value in such a way that the ΔN value approximates the ΔNref value, and f) Adjusting the HCOG value to be considered by the dynamic control functions of said vehicle.

The present method may further include a step e') consisting of or comprising repeating step d) and step e) one or more times during the same braking period.

It may alternatively or in addition include a step e") consisting of or comprising repeating steps a), b), c), d) and e) one or more times during the same braking period.

In step a), any known method may be used to determine the slippage rate of the wheels. A wheel rotation is preferably determined by the mean of a wheel rotation sensor already present on the vehicle. The absolute speed of the vehicle may also be determined by the sensors already used for other functions of the vehicle. An average slippage rate may be determined for one or more set of wheels. For example, for a vehicle having two axles, the average slippage rate for the front wheels is determined separately from the average slippage rate for the rear wheels. Thus, in step a), the determination of the slippage rate of the wheels includes the determination of the slippage rate of the front wheels, and the determination of the slippage rate of the rear wheels.

The normal forces applied to the front wheels and to the rear wheels during the braking period are deduced in step b) from the corresponding slippage rate defined in step a). In this way, the difference between the normal force applied to the front wheels and the normal force applied to the rear wheels can be determined. The difference of the normal forces is directly related to the load transfer during the braking period. The determination of the normal forces in this step only involves parameters which are independent from the HCOG value of the vehicle. The term "independent", in this context, means that said parameters are not the HCOG value itself, and that they are not influenced by the HCOG value. In general way, any parameter may be used to determine the normal forces based on the slippage rate of the wheels, providing that it is independent from the HCOG value of the vehicle. Preferably, predefined parameters which are characteristic of the vehicle itself, independently of the payload, are considered. For example, the adherence, which is determined from the slippage rate of the wheels according to a pre-established curve, may be used to access the normal forces. The tangential forces applied to the wheels during the braking period may also be considered, since they relate to the characteristics of the vehicle, and in particular to the braking system of the vehicle, as such. The tangential forces are commonly deduced from the brake pressure applied within the braking system of the vehicle, and collected through pressure sensors. In a preferred embodiment, the combination of the adherence and the tangential forces applied to the wheels during a braking period are considered to identify the corresponding normal forces. The difference between the normal force applied to the front wheels, and the normal force applied to the rear wheels, being computed with parameters independent from the height of the gravity center, is thus taken as a reference value.

In other words, step b) comprises the sub-steps b1) of determining the adherence (AF) for the wheels of said front axle, and the adherence (AR) for the wheels of said rear axle, b2) of determining the tangential forces (TF) for the wheels of said front axle, and the tangential forces (TR) for the wheels of said rear axle, and b3) of deducing from the steps b1) and b2) the normal force (NF) for the wheels of said front axle, and the normal force (NR) for the wheels of said rear axle.

The difference of the normal forces applied to the front wheels and the rear wheels, is concomitantly determined in step c), using one or more parameters related to the HCOG value. These parameters may include the HCOG value itself or a parameter proportional to the HCOG value, from which the HCOG value can easily be deduced. Said parameter is a variable parameter, meaning that it can be increased or decreased. Some of the other parameters used in step c) may be the same as those used in step b), like for example the tangential forces. Different parameters, related to the geometry of the vehicle may also be considered. In particular, values related to the dimensions of the vehicle, like the length of the vehicle, the distance between a front and a rear axle, the weight of the vehicle or parts of the vehicle, the height of the vehicle can be considered. Preferably, the braking torque applied to the wheels, combined to some geometrical aspects of the vehicle, and the variable parameter related to the HCOG value, are considered to evaluate the difference between the normal force applied to front wheels and the normal forces applied to the rear wheels, during a braking period. Among the geometrical aspects of the vehicle, the distance between a front and a rear axle is advantageously considered.

The difference between the normal forces of the front wheels and the rear wheels, defined according to step b) may be different from the corresponding parameter defined in step c). If this is the case, the variable parameter related to the HCOG value, used in step c) is adjusted in step e) in such a way that the value of the difference between the normal forces at front wheels and at rear wheels, determined according to step c), approximates the corresponding reference value determined in step b). The term "approximates" should be understood as "coming as close as possible", meaning that the values can be equal, or proximate. However, the method is also functional if it merely reduces the divergence between the two values computed in step b) and in step c) above. Under these circumstances, the risk of malfunction of the dynamic control system is anyway reduced at the beginning of the travel.

The adjustment of the parameter related to the height of the gravity center may be performed once or several times. In other words, steps d) and e) can be iterated, in a step e'), using for each iteration the value obtained after the previous iteration. Such iterative process is performed during one individual braking period, considering that the reference value computed in steps a) en b) remains unchanged.

Alternatively, all the steps a), b), c), d) and e) may be iterated during a given braking action. This may be appropriate in case the braking torque applied during said braking action is not constant.

Above and below, the terms "braking period" refers to a period of time during which the vehicle is decelerated using the brake system. A braking period may last from few milliseconds or less, to several seconds. A "braking action" corresponds to the activation of the brake system by the driver, for example by pushing a brake device. It starts at the beginning of the brake activation, and ends when the driver releases the brake device. Several braking periods may be considered during a single braking action. A brake device can be the brake pedal. In some circumstances, the brake device may also be a park brake activation device.

The practitioner will thus clearly understand that the aim of the present method is not to provide a real value of the HCOG, but only to estimate and adapt the HCOG value according to the running conditions, based on a reference value. In other words, the HCOG value already implemented within the dynamic control system of the vehicle can be increased or decreased by a certain amount to approximate the real running conditions.

The computation of the data according to this method is much faster, compared to the real determination of the HCOG value, and provides a quick and efficient adaptation of the dynamic control system of the vehicle. This method does not prevent any further HCOG value determination during the travel, with computation methods which are more time consuming.

The present invention also relates to a system able to collect the necessary data during one or several braking periods and concomitantly compute the difference between the normal forces applied to the front wheels and the normal forces applied to the rear wheels, using two different computation processes. In particular, such a system computes the above-mentioned values according to the method here described. The system is also able to compare to each other the two computed values, and to adjust one or more parameters related to the HCOG value, in such a way to reduce the divergence between the two computed values. The system is preferably adapted to establish several iterations during a same braking period or at least during a given braking action. The present system is able to provide instructions to the dynamic control system of the vehicle to increase or decrease the HCOG estimated value by a certain amount. It can be included or integrated within the dynamic control system of the vehicle.

A vehicle equipped with such a system is also covered by the invention.

Figure 1:
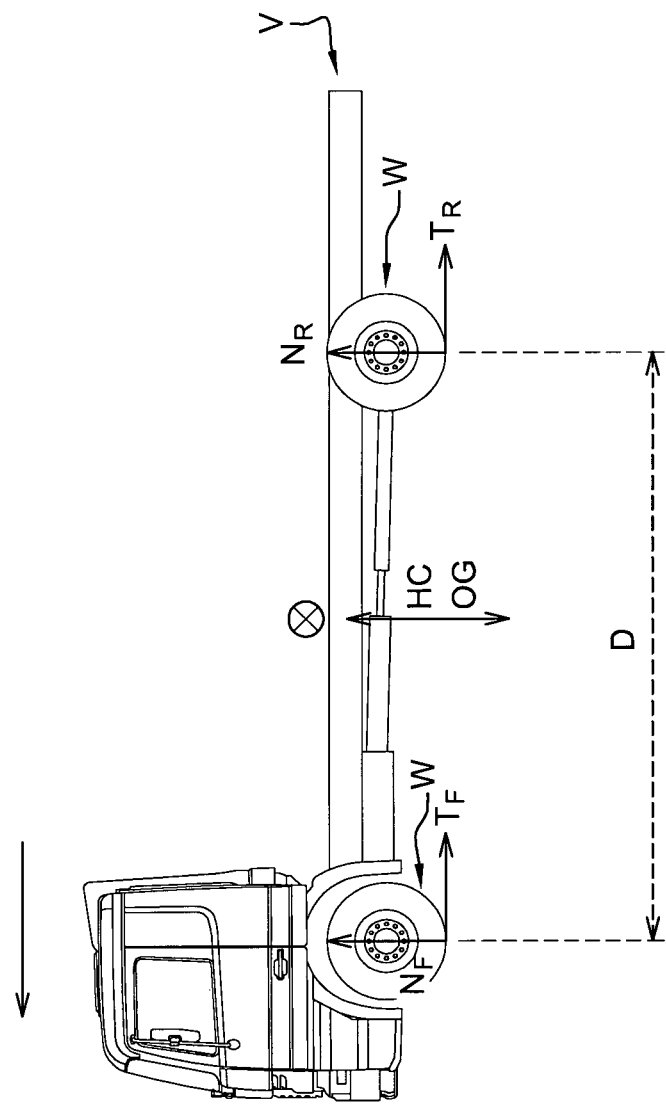
FIG. 1 Distribution of the normal forces and tangential forces during the braking of a vehicle.
Figure 2:
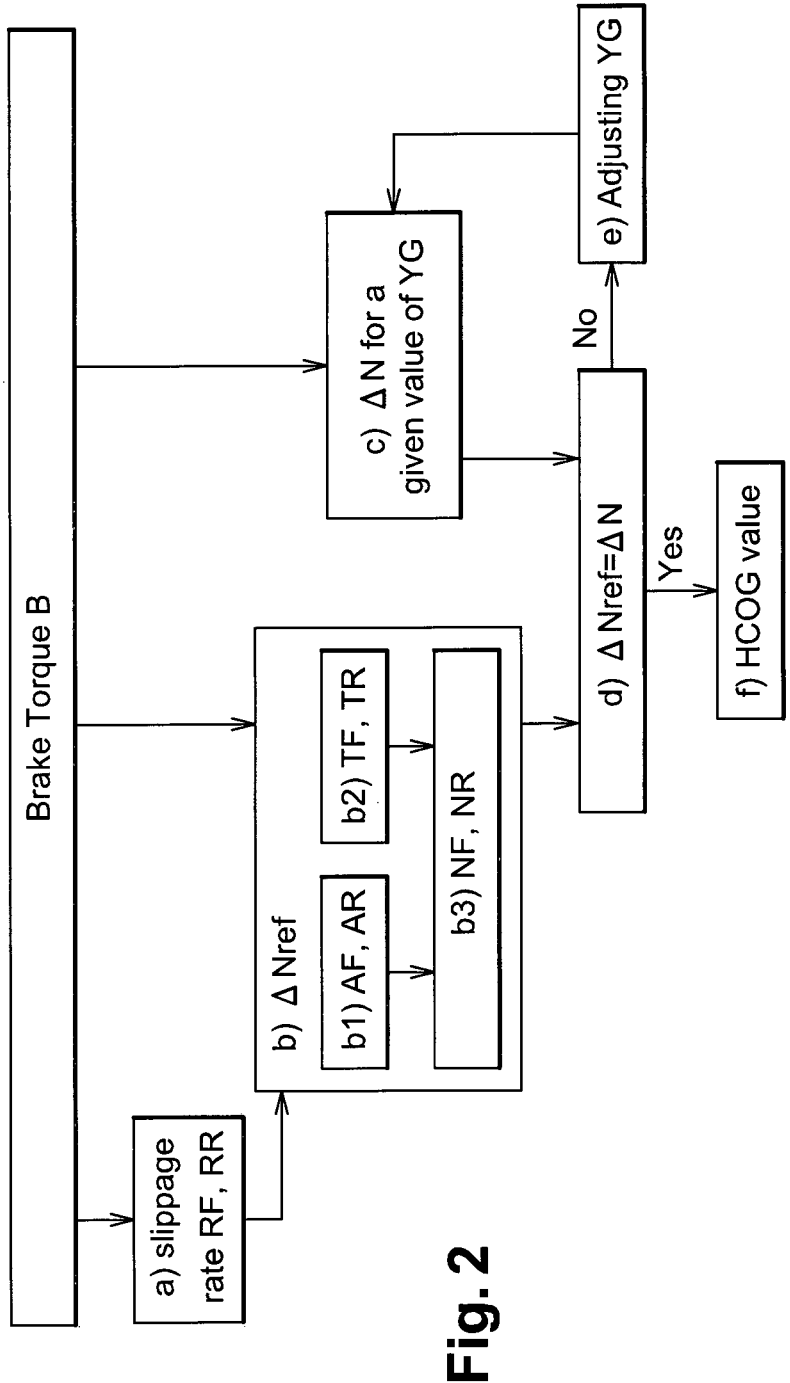
FIG. 2 graphical representation of the method
Figure 3:
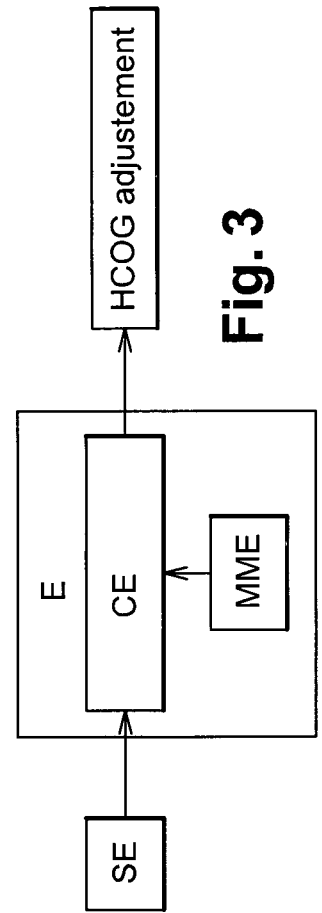
FIG. 3 Schematic representation of the system used to adjust the estimated HCOG value Detailed description In one step of the present method, during a braking period, the slippage rate R of a wheel W is determined according to the general Formula (1) below.

$$R = \frac{VS - WS}{VS} * 100 \qquad (1)$$

Wherein

R denotes the slippage rate of a given wheel W, provided as a percentage,

VS denotes the linear speed of the vehicle V, provided in meters per second,

WS denotes the linear speed of the wheel W, also provided in meter per second,

The linear speed WS of a wheel W is easily deduced from the rotational speed of the wheel W, knowing its radius. Thus, le linear speed WS of a wheel corresponds to the linear speed VS of the vehicle if no slippage occurs.

Although the slippage of each wheel W is independently determined, an average slippage rate RF is determined for the front wheels, and an average slippage rate RR is determined for the rear wheels of the vehicle. In other words, the slippage rate RF may be determined from the formula (1a), $$RF = \frac{VS - WSF}{VS} * 100 \qquad (1a)$$

Wherein VS has the same meaning as above, and wherein the linear speed WSF for the front wheels is considered, while the slippage rate RR for the rear wheels is determined according to formula (1b):

$$RR = \frac{VS - WSR}{VS} * 100 \qquad (1b)$$

Wherein VS has the same meaning as above, and wherein the linear speed WSR for the rear wheels is considered.

The front wheels preferably denote the wheels of one front axle, and the rear wheels preferably denote the wheels of one rear axle, either twined or single. In case the vehicle comprises more than one front axle and/or more than one rear axle, an average slippage rate may be determined for each of the front axles, and each of the rear axles. Alternatively, the average slippage rate may be determined for all the front axles, and an average slippage rate may be determined for all the rear axles of the vehicle.

A vehicle is usually characterized by a pre-established experimental curve which links the slippage R of the wheels to the adherence A. Thus, based on the characteristics of the vehicle, the adherence AF of the wheels of the front axle can be deduced from the slippage rate RF of the front wheels determined as above described. Similarly, the adherence AR of the wheels of the rear axle may be deduced from the slippage rate RR of the rear wheels.

The adherence is commonly defined by the ratio of the tangential forces T to the normal forces N. Thus, the adherence of the wheels of a front axle AF is defined by the formula (2a), and the adherence AR of the wheels of a rear axle is defined by the formula (2b):

$$AF = \frac{TF}{NF} \qquad (2a)$$

$$AR = \frac{TR}{NR} \qquad (2b)$$

Wherein

AF, AR, respectively denote the adherence of the wheels of a front axle and a rear axle, TF, TR respectively denote the tangential forces at the front wheels and at the rear wheels, NF, NR, respectively denote the normal forces at the front wheels and at the rear wheels.

The tangential forces TF and TR are easily determined according to the formulae (3a) and (3b):

$$TF = \frac{Q * KF}{Wrad} \qquad (3a)$$

$$TR = \frac{Q * KR}{Wrad} \qquad (3b)$$

Wherein

TF and TR have the same meaning as above,

Q denotes the brake factor,

KF, and KR respectively denote the brake pressure at the front wheels and at the rear wheels, Wrad denotes the radius of the wheel W.

Wrad is usually the same for the front and the rear wheels. However, a specific radius may be considered for each wheel. The same applies for the brake factor Q.

It appears that the tangential forces TF, TR, as determined in formulae (3a) and (3b), only relate to the vehicle characteristics. The brake factor is inherent to the braking system of the vehicle, and the wheel radius Wrad is determined by construction. The brake pressure (KF, KR) is measured by the corresponding brake sensors already present on the vehicle. Knowing the tangential forces (TF, TR) and the corresponding adherence (AF, AR) of the front and the rear wheels, the corresponding normal forces (NF, NR) are easily deduced from the formulae (2a) and (2b).

The difference between the normal forces of the front wheels NF and the rear wheels NR, determined as above, during a braking period, provides a reference value $\Delta Nref$. More particularly:

$$\Delta Nref = NR - NF$$

Wherein NR and NF are determined as above-described.

Alternatively, the absolute value of the difference between NR and NF may be considered as a reference value.

Simultaneously, the difference $\Delta N$ between the normal forces at a front axle and the normal forces at a rear axle is determined according to the geometry of the vehicle according to the formula (4):

$$\Delta N = \frac{B * YG}{D} \qquad (4)$$

Wherein

B denotes the global braking torque applied to the wheels of the vehicle during the braking period, YG is a variable parameter related to the height of the gravity center of the vehicle, D is the distance separating the front axle and the rear axle.

The global braking torque B is determined by the brake sensors of the vehicle. The global braking torque B is defined by formula (5):

$$B = Q(KF + KR) \qquad (5)$$

Wherein B, Q, KF and KR have the same meaning as above. The distance D is known from the vehicle characteristics.

In such a way, the difference of the normal forces $\Delta N$ only depends on the variable parameter YG.

Since $\Delta N$ and $\Delta Nref$ are simultaneously determined during the same braking period, they can be compared to each other. The variable parameter YG is adjusted in such a way that $\Delta N$ and $\Delta Nref$ become identical or almost identical. In other words, the difference between ΔN and ΔNref may be considered acceptable if it is below 10%, or below 5% or below 1%. More particularly, an updated variable parameter YG will be considered for adjusting the estimated HCOG value in the dynamic control system if ΔN~ΔNref, or if ΔN=ΔNref The optimization of the variable parameter YG may request several iterations, wherein ΔN is compared to ΔNref at each iteration, until the values of ΔN and ΔNref are sufficiently close to each other. The variable parameter YG may thus be increased or decreased by a predetermined value, like 1%, or 5% or 10%, at each iteration.

Each iteration may correspond to separate activation of the brake pedal. However, the present method preferably allows fast iterations during a single braking action. It is thus possible to adapt the estimated HCOG value of the vehicle within a limited number of brake activations. Ideally, the estimated HCOG value can be adjusted as soon as the first braking action.

The present invention further comprises a system E for estimating and adapting the estimated HCOG value of a vehicle according to its payload. Said system E collects data from one or more sensors SE of the vehicle, and in particular wheel rotation sensors and brake pressure sensors. The system E further collects data stored in a Read Only Memory ME and related to the geometry of the vehicle. In particular such data comprise the distance D separating a front and a rear axle, the weight of the vehicle or elements of the vehicle, and other dimensions related to the vehicle.

The System E comprises a computing unit CE, able to compute the data received from sensors and from the Read Only Memory ME according to the method above described. The system E provides instructions to the dynamic control system to increase or decrease the HCOG value by a certain amount.

The present invention is also directed to a vehicle equipped with a system E, or an equivalent system designed for computing the data according to the method above described.

The invention claimed is:

1. A method for adjusting an estimated HCOG value of a vehicle V, comprising a front axle and a rear axle, said method comprising the steps of:

a) determining the slippage rate (RF) for the wheels of the front axle and the slippage rate (RR) for the wheels of the rear axle during a braking period according to the general formulae:

$$RF = \frac{VS - WSF}{VS} * 100 \quad \text{(i)}$$

$$RR = \frac{VS - WSR}{VS} * 100 \quad \text{(ii)}$$

wherein
(VS) denotes the linear speed of the vehicle (V),
(WSF) denotes the linear speed of the front wheel,
(WSR) denotes the linear speed of the rear wheel, b) deducing from the slippage rate (RF) and (RR) determined in step a), the reference value (ΔNref) corresponding to the difference between the normal force (NF) applied to the wheels of said front axle and the normal force (NR) applied to the wheels of said rear axle, using parameters independent from the HCOG value, by:

b1) determining the adherence (AF) for the wheels of said front axle, and the adherence (AR) for the wheels of said rear axle, according to at least one pre-established curve linking the slippage rate of a wheel to its adherence, b2) determining the tangential forces (TF) for the wheels of said front axle and the tangential forces (TR) for the wheels of said rear axle according to the formulae:

$$TF = \frac{Q * KF}{Wrad} \quad \text{(iii)}$$

$$TR = \frac{Q * KR}{Wrad} \quad \text{(iv)}$$

wherein
(Q) denotes the brake factor,
(KF), and (KR) respectively denote the brake pressure at the front wheels and at the rear wheels,
(Wrad) denotes the radius of the considered wheels (W), b3) deducing from the steps b1) and b2) the normal force (NF) for the wheels of said front axle, and the normal force (NR) for the wheels of said rear axle according to the formulae:

$$AF = \frac{TF}{NF} \quad \text{(v)}$$

$$AR = \frac{TR}{NR} \quad \text{(vi)}$$

wherein
(AF), (AR), denote the adherence determined in step b1),
(TF), (TR) denote the tangential forces determined in step b2), and
(NF), (NR), respectively denote the normal forces at the front wheels and at the rear wheels, c) determining the difference (ΔN) between the normal forces applied to the wheels of the front axle and the normal forces applied to the wheels of the rear axle, according to formula:

$$\Delta N = \frac{B * YG}{D} \quad \text{(vii)}$$

wherein
(YG) is a variable parameter related to the height of the gravity center of the vehicle,
(D) is the distance separating the front axle and the rear axle, and wherein
(B) denotes the global braking torque applied to the wheels of the vehicle and is defined by formula (5):

$$B = Q(KF + KR) \quad \text{(viii)}$$

d) comparing (ΔN) determined in step c) with (ΔNref) determined in step b), e) adjusting the variable parameter (YG), when necessary, in such a way the difference between (ΔN) and (ΔNref) is below 10%, and f) adjusting the HCOG value according to (YG) determined in step e), wherein a computing unit provides instructions to a dynamic control system to increase or decrease the HCOG value by a certain amount.

2. The method according to claim 1, wherein the slippage rates (RF) and (RR) are determined by the means of sensors.

3. A system for adjusting the height of the gravity center of a vehicle comprising a front axle and a rear axle, said system comprising a computing unit (CE), wherein that said computing unit (CE) receives data from one or more sensors (SE) of the vehicle, and a Read Only Memory (ME), wherein said computing unit (CE) is configured to:
a) determine the slippage rate (RF) for the wheels of the front axle and the slippage rate (RR) for the wheels of the rear axle during a braking period according to the general formulae:

$$RF = \frac{VS - WSF}{VS} * 100 \quad \text{(i)}$$

$$RR = \frac{VS - WSR}{VS} * 100 \quad \text{(ii)}$$

wherein
(VS) denotes the linear speed of the vehicle (V),
(WSF) denotes the linear speed of the front wheel,
(WSR) denotes the linear speed of the rear wheel,
b) deduce from the slippage rate (RF) and (RR) determined in step a), the reference value (ΔNref) corresponding to the difference between the normal force (NF) applied to the wheels of said front axle and the normal force (NR) applied to the wheels of said rear axle, using parameters independent from the HCOG value, by:
b1) determining the adherence (AF) for the wheels of said front axle, and the adherence (AR) for the wheels of said rear axle, according to at least one pre-established curve linking the slippage rate of a wheel to its adherence,
b2) determining the tangential forces (TF) for the wheels of said front axle and the tangential forces (TR) for the wheels of said rear axle according to the formulae:

$$TF = \frac{Q * KF}{Wrad} \quad \text{(iii)}$$

$$TR = \frac{Q * KR}{Wrad} \quad \text{(iv)}$$

wherein
(Q) denotes the brake factor,
(KF), and (KR) respectively denote the brake pressure at the front wheels and at the rear wheels,
(Wrad) denotes the radius of the considered wheels (W),
b3) deducing from the steps b1) and b2) the normal force (NF) for the wheels of said front axle, and the normal force (NR) for the wheels of said rear axle according to the formulae:

$$AF = \frac{TF}{NF} \quad \text{(v)}$$

$$AR = \frac{TR}{NR} \quad \text{(vi)}$$

wherein
(AF), (AR), denote the adherence determined in step b1),
(TF), (TR) denote the tangential forces determined in step b2), and
(NF), (NR), respectively denote the normal forces at the front wheels and at the rear wheels,
c) determine the difference (ΔN) between the normal forces applied to the wheels of the front axle and the normal forces applied to the wheels of the rear axle, according to formula:

$$\Delta N = \frac{B * YG}{D} \quad \text{(vii)}$$

wherein
(YG) is a variable parameter related to the height of the gravity center of the vehicle,
(D) is the distance separating the front axle and the rear axle, and wherein
(B) denotes the global braking torque applied to the wheels of the vehicle and is defined by formula:

$$B = Q(KF + KR) \quad \text{(vii)}$$

d) compare (ΔN) determined in step c) with (ΔNref) determined in step b),
e) adjusting the variable parameter (YG), when necessary, in such a way the difference between (ΔN) and (ΔNref) is below 10%, and
f) adjust the HCOG value according to (YG) determined in step e), and wherein said computing unit (CE) provides instructions to a dynamic control system to increase or decrease the HCOG value by a certain amount.

4. A vehicle comprising a front axle and a rear axle and equipped with a system for adjusting the height of the gravity center of the vehicle, said system comprising a computing unit (CE), wherein that said computing unit (CE) receives data from one or more sensors (SE) of the vehicle, and a Read Only Memory (ME), wherein said computing unit (CE) is configured to:
a) determine the slippage rate (RF) for the wheels of the front axle and the slippage rate (RR) for the wheels of the rear axle during a braking period according to the general formulae:

$$RF = \frac{VS - WSF}{VS} * 100 \quad \text{(i)}$$

$$RR = \frac{VS - WSR}{VS} * 100 \quad \text{(ii)}$$

wherein
(VS) denotes the linear speed of the vehicle (V),
(WSF) denotes the linear speed of the front wheel,
(WSR) denotes the linear speed of the rear wheel, b) deduce from the slippage rate (RF) and (RR) determined in step a), the reference value (ΔNref) corresponding to the difference between the normal force (NF) applied to the wheels of said front axle and the normal force (NR) applied to the wheels of said rear axle, using parameters independent from the HCOG value, by:

b1) determining the adherence (AF) for the wheels of said front axle, and the adherence (AR) for the wheels of said rear axle, according to at least one pre-established curve linking the slippage rate of a wheel to its adherence, b2) determining the tangential forces (TF) for the wheels of said front axle and the tangential forces (TR) for the wheels of said rear axle according to the formulae:

$$TF = \frac{Q*KF}{Wrad} \quad \text{(iii)}$$

$$TR = \frac{Q*KR}{Wrad} \quad \text{(iv)}$$

wherein
(Q) denotes the brake factor,
(KF), and (KR) respectively denote the brake pressure at the front wheels and at the rear wheels,
(Wrad) denotes the radius of the considered wheels (W), b3) deducing from the steps b1) and b2) the normal force (NF) for the wheels of said front axle, and the normal force (NR) for the wheels of said rear axle according to the formulae:

$$AF = \frac{TF}{NF} \quad \text{(v)}$$

$$AR = \frac{TR}{NR} \quad \text{(vi)}$$

wherein
(AF), (AR), denote the adherence determined in step b1),
(TF), (TR) denote the tangential forces determined in step b2), and
(NF), (NR), respectively denote the normal forces at the front wheels and at the rear wheels, c) determine the difference (ΔN) between the normal forces applied to the wheels of the front axle and the normal forces applied to the wheels of the rear axle, according to formula:

$$\Delta N = \frac{B*YG}{D}$$

wherein
(YG) is a variable parameter related to the height of the gravity center of the vehicle,
(D) is the distance separating the front axle and the rear axle, and wherein
(B) denotes the global braking torque applied to the wheels of the vehicle and is defined by formula:

$$B = Q(KF + KR) \quad \text{(viii)}$$

d) compare (ΔN) determined in step c) with (ΔNref) determined in step b), e) adjust the variable parameter (YG), when necessary, in such a way the difference between (ΔN) and (ΔNref) is below 10%, and f) adjust the HCOG value according to (YG) determined in step e), and wherein said computing unit (CE) provides instructions to a dynamic control system to increase or decrease the HCOG value by a certain amount.

* * * * *